(12) United States Patent
Nguyen et al.

(10) Patent No.: US 8,111,696 B2
(45) Date of Patent: Feb. 7, 2012

(54) METHOD TO IMPROVE THE PERFORMANCE OF A COMPUTER NETWORK

(75) Inventors: Vuong Cao Nguyen, Costa Mesa, CA (US); Steven Gerard Lemire, Costa Mesa, CA (US); Raul Bersamin Oteyza, Costa Mesa, CA (US); Jeff Junwei Zheng, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 243 days.

(21) Appl. No.: 12/251,290

(22) Filed: Oct. 14, 2008

(65) Prior Publication Data
US 2010/0091658 A1 Apr. 15, 2010

(51) Int. Cl.
*H04L 12/28* (2006.01)
(52) U.S. Cl. .................. 370/392; 370/388; 370/349
(58) Field of Classification Search .................. 709/223; 370/392, 389, 349; 711/154
See application file for complete search history.

(56) References Cited

U.S. PATENT DOCUMENTS

| | | | |
|---|---|---|---|
| 4,429,363 A * | 1/1984 | Duke et al. | 711/122 |
| 6,134,617 A * | 10/2000 | Weber | 710/105 |
| 6,304,910 B1 * | 10/2001 | Roach et al. | 709/236 |
| 6,370,605 B1 * | 4/2002 | Chong, Jr. | 710/33 |
| 6,701,411 B2 * | 3/2004 | Matsunami et al. | 711/114 |
| 7,133,363 B2 * | 11/2006 | Takase et al. | 370/230 |
| 7,349,999 B2 * | 3/2008 | Krithivas | 710/33 |
| 2002/0147802 A1 * | 10/2002 | Murotani et al. | 709/223 |
| 2003/0097607 A1 * | 5/2003 | Bessire | 714/5 |
| 2004/0059807 A1 * | 3/2004 | Klotz et al. | 709/223 |
| 2006/0056435 A1 * | 3/2006 | Biran et al. | 370/412 |
| 2006/0230218 A1 * | 10/2006 | Warren et al. | 710/315 |
| 2006/0235977 A1 * | 10/2006 | Wunderlich et al. | 709/227 |
| 2006/0248292 A1 * | 11/2006 | Suresh | 711/154 |
| 2009/0287898 A1 * | 11/2009 | Hara | 711/170 |

* cited by examiner

*Primary Examiner* — Gary Mui
*Assistant Examiner* — Dewanda Samuel
(74) *Attorney, Agent, or Firm* — Morrison & Foerster LLP (57) ABSTRACT

A method is disclosed for indicating a status of a transfer of data from a first device to a second device over a network. In one embodiment, the data includes one or more data frames. Each frame includes a header having one or more bits. The method includes setting a last bit of the one or more bits in the header of a last frame of the one or more data frames to a first value if the status of the transfer of data is good and setting the value of the last bit of the last data frame to a second value if the transfer of data failed. This results in a less congested, more efficient network.

11 Claims, 5 Drawing Sheets

METHOD TO IMPROVE THE PERFORMANCE OF A COMPUTER NETWORK

FIELD OF THE INVENTION

This invention relates generally to a method for improving network performance and efficiency, and more particularly to a method for reducing the number of frames in network traffic.

BACKGROUND OF THE INVENTION

Computer networks have become an integral part of the business world. The ability to move large quantities of data in a short period of time is critical to many business operations. Given the huge amount of traffic handled by a typical enterprise network, such as a Storage Area Network (SAN), there is always a need to improve the performance and efficiency of these networks to meet end users' needs. Typical hardware solutions such as expanding the physical bandwidth of the network or increasing the processing power of the servers may be too costly to implement. A more effective and less expensive way to improve network performance and efficiency is desired.

SUMMARY OF THE INVENTION

In one embodiment of the invention, a read operation is completed without using a separate status frame to deliver the status information at the end of a data transfer. In the first phase of the read operation, the initiator sends a read command to the target via a network. The target then processes the read command and, in response, provides the requested data to the initiator in one or more sequences of data frames during the subsequent data phase. However, in this embodiment, there is not a third (status) phase during which time a status frame is transmitted on its own from the target to the initiator to indicate whether the read operation has been a success. Instead, a "good" status may be indicated in the last data frame transmitted in the data phase.

In another embodiment of the invention, one or more of the bits in the header of one of the data frames are used to indicate a successful data transfer, thereby eliminating the need for a separate status frame trailing the data frames. Preferably, the very last data frame of the whole transfer carries the status information. In one embodiment, an unassigned bit may be set to either "1" or "0," just like any other bits in the frame. A value of "1" may indicate that there has been an error during the data transfer, and a value of "0" indicates an errorless transfer. Accordingly, the initiator may be programmed to learn the status of the transfer by reading the value of the designated bit in the last data frame. No additional status frame needs to be transmitted unless it needs to learn more detail about an error condition.

A number of existing protocols may be modified to utilize embodiments of this invention. For example, the SCSI over Fibre Channel protocol running over a Fibre Channel link may indicate good status by setting the Last Sequence (LS) bit in the frame header of the last data frame along with the End Sequence (ES) bit. When the initiator receives the last data frame and sees that the LS and ES bits have been set, the initiator recognizes that the status of the transfer is good and continues to process the next request without waiting for the status frame.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In general, embodiments of the present invention improve the performance and efficiency of a network by eliminating the status phase of a data transfer between two devices connected to the network. The status phase is typically the last phase of each data transfer, taking place after the actual data is (or should have been) transmitted. During the status phase, the device requesting the data is informed about whether the request has been executed successfully or not. Traditionally, using existing network protocols, the status information is stored in a status frame, which is transmitted separately from the frames containing the actual data. However, transmitting status frames over the network for each data transfer creates additional overhead in terms of additional buffers on the receiving end to store the status frames, and extra processing cycles needed to process them. It also increases network traffic and thus slows down overall network performance. Therefore, by eliminating the status phase of each data transfer, substantial savings in network resources can be realized and the overall performance of the network can be improved. The following paragraphs describe in more detail the shortcomings of the existing protocols that require the use of a separate frame to transmit the status information, and introduce a method to eliminate the status phase without losing status information during a data transfer.

Figure 1:
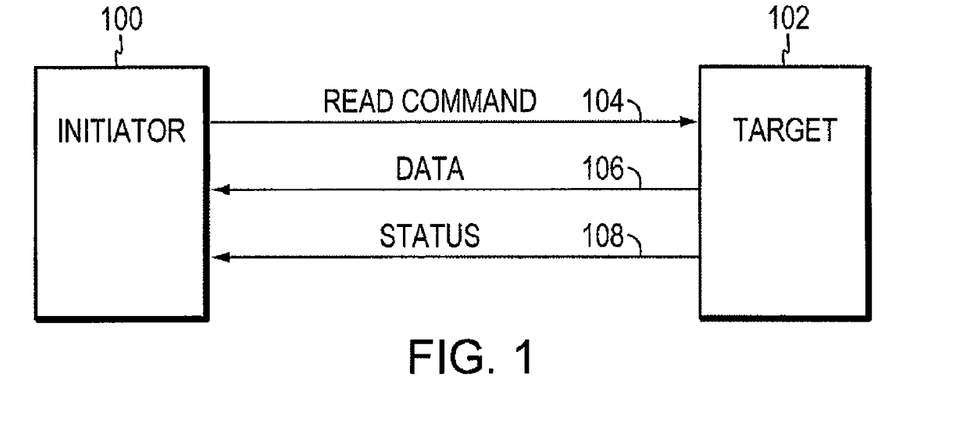
FIG. 1 is a block diagram illustrating the steps of a data transfer between an initiator and a target using existing network communication methods.

A typical read data transfer over a network running an existing protocol is first described. Referring to FIG. 1, an initiator 100 and a target 102 are two devices connected to each other via the network (not shown). In various embodiments, the initiator 100 may be a server, a work station, or any other type of computer suitable for requesting and receiving data from other devices (e.g., the target 102) on the network. The target 102 may be a storage server, a hard drive of a computer or any other computer device suitable for storing data and responding to data requests made by other devices (e.g., the server) on the network. The network may be a Fibre Channel network or a Fibre Channel over Ethernet (FCoE) network. Those skilled in the art will appreciate, however, that the network may be any other computer network commonly used for transmitting data.

FIG. 1 illustrates the essential steps involved in a typical data transfer from the initiator 100 to the target 102, using one of the standard existing network protocols. During the first phase (i.e., the command phase 104), the initiator 100 sends a read command to the target 102, requesting specific data. After receiving the read command, the target 102 locates the requested data and sends it over the network to the initiator 100 (the data phase 106). As is typical in computer network communication, the data may be divided into segments and packaged in one or more frames (i.e., packets) for transmission over the network. The frames may be grouped together to form a number of data sequences. In the last phase of the communication (i.e., the status phase 108), after all the data frames have been transmitted, the target 102 sends a status frame containing the status of the transfer to the initiator 100, thereby terminating the communication. If the transfer was a success and the initiator 100 received all the data it requested, a "good" status is indicated by the status frame. However, if an error occurred during the data transfer, a "failed" status is indicated in the status frame so that error correction mechanisms on the initiator 100 can be initiated to isolate the cause of the failure and fix the error.

Typically, the status information is sent separately from the actual data. That is, the status frame is not one of the data frames. The status frame is used exclusively for carrying the status information and is sent following the data frames during the status phase 108 of the data transfer. Existing protocols may use multiple status frames to transport status information. Because they are transmitted separately from the data frames, the status frames may form a sequence on their own. While the practice of using separate status frame(s) in a data transfer is widely adopted in existing network protocols, it is not the most efficient way to transmit the status of a data transfer between devices. Any time a frame is transmitted from one device to another over the network, it not only increases the traffic on the network, but also requires additional buffer space on the receiving device to at least temporarily store the frame upon its arrival. Additional processing cycles may also be necessary to extract information from the status frame(s). Embodiments of the present invention, as described in detail below, provide a solution for optimizing network performance and efficiency by including the status of data operations in one of the data frames rather than in a separate status frame, thereby eliminating the network overhead and delays caused by the transmission of the extra status frames. As later discussion will make apparent, the performance improvement may be significant for any network that adopts the disclosed methods, especially those networks that handle a lot of read operations, each involving a small amount of data. Certain types of networks, such as Fibre Channel over Ethernet (FCoE) networks, may benefit more than others from incorporating the embodiments of the invention.

Figure 2:
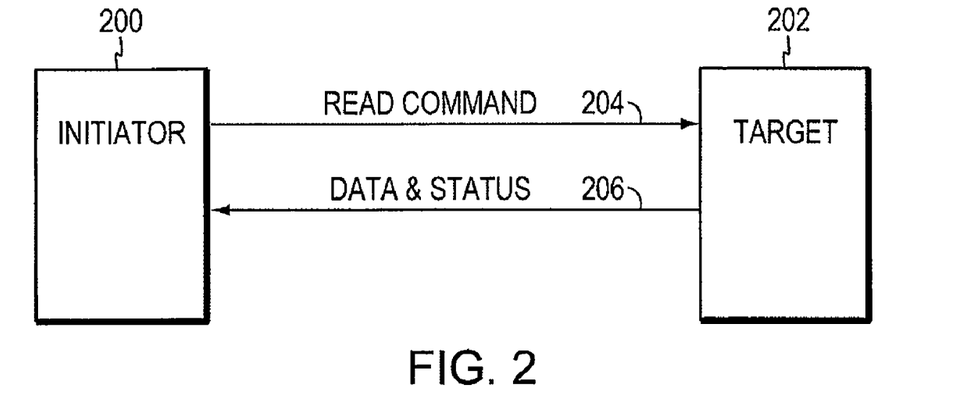
FIG. 2 is a block diagram illustrating the steps of a data transfer between an initiator and a target using a modified network communication method according to embodiments of the present invention.

Because it usually only takes one frame to transport the status information and the status frame is typically the last frame transmitted in a read operation, it is possible to eliminate the status frame and instead use one of the data frames to carry the status information without affecting the operation in any significant way. FIG. 2 illustrates one embodiment of the invention, in which a read operation similar to the one illustrated in FIG. 1 is completed without using a separate status frame to deliver the status information at the end of the data transfer. As illustrated, the first phase of the read operation, the command phase 204, remains the same. The initiator 200 sends a read command to the target 202 via a network. As shown in FIG. 1, the target 202 then processes the read command and, in response, provides the requested data to the initiator 200 in one or more sequences of data frames during the subsequent data phase 206. However, in this embodiment, there is no longer a third (status) phase during which time a status frame is transmitted on its own from the target 202 to the initiator 200 to indicate whether the read operation has been a success. Instead, a "good" status may be indicated in the last data frame transmitted in the data phase.

Figure 3:
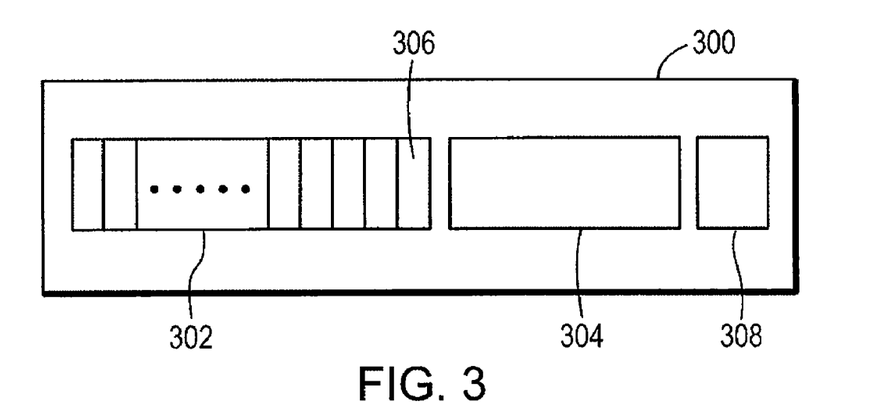
FIG. 3 illustrates the structure of a data frame used to transport status information during a data transfer according to embodiments of the present invention.

Although frames used for transporting data over networks running different protocols may be structurally different, most frames share some of the same basic parts. FIG. 3 illustrates the basic structure of a typical data frame 300 (e.g., an Ethernet frame) suitable for transmitting data over a network. The typical data frame 300 includes a header 302, a body 304 (i.e., payload), and a trailer 308 (i.e., pad). The header 302 typically contains supplemental data placed at the beginning of a block of data being stored or transmitted in the frame. The block of data being stored or transmitted occupies the body 304 of the frame. The trailer 308 may include additional supplemental data, placed at the end of the block of data being stored or transmitted, that may contain information for handling of the data block, or may just mark its end. Each of the header 302, body 304, and trailer 308 may comprise one or more bits.

One or more data frames can form a data sequence. Multiple data sequences may be used to transport the requested data in response to a read command. For example, if a total of 300 kilobytes of read data is requested, all 300 kilobytes may be sent in one long sequence from the target. Alternatively, the 300 kilobytes may be divided into multiple sequences containing different amounts of data. There is generally no requirement or limitation on how many sequences there can be in one data transfer.

Referring again to FIG. 1, when using existing protocols, the status frame is transmitted after the data frames, and the last sequence typically only includes the status frame. Thus, receiving the status frame indicates that the data transfer is complete—there are no more sequences or frames to be received. Using methods introduced in some embodiments of the current invention, the last sequence containing the status frame can be dropped. Instead, the arrival of the last data frame implies the end of the transfer.

The transmission of status information without using a separate status frame will now be described. In one embodiment of the invention, one or more of the bits in the header of one of the data frames are used to indicate a successful data transfer, thereby eliminating the need for a separate status frame trailing the data frames. Preferably, the very last data frame of the whole transfer carries the status information. As mentioned above, the bits in the header of a frame may be used to store supplemental data such as the length of the frame, the identification of the source of the frame, and the type of data being stored in the body of the frame. However, not every bit in a header is used for a predefined purpose. In fact, most network protocols reserve one or more bits in the header of each frame for vendor-specific features. Referring to FIG. 3 again, at least one of these reserved bits 306 in the last data frame may be designated to indicate the status of the data transfer of which the frame is a part. In one embodiment, the unassigned bit 306 may be set to either "1" or "0," just like any other bits in the frame. A value of "1" may indicate that there has been an error during the data transfer, and a value of "0" indicates an errorless transfer. Accordingly, the initiator may be programmed to learn the status of the transfer by reading the value of the designated bit in the last data frame. No additional status frame needs to be transmitted unless it needs to learn more detail about an error condition.

A number of existing protocols may be modified to utilize embodiments of this invention. For example, the SCSI over Fibre Channel protocol running over a Fibre Channel link may indicate good status by setting the Last Sequence (LS) bit in the frame header of the last data frame along with the End Sequence (ES) bit. When the initiator receives the last data frame and sees that the LS and ES bits have been set, the initiator recognizes that the status of the transfer is good and continues to process the next request without waiting for the status frame.

In another embodiment, if there is an error during the data transfer, the network may revert back to the existing protocol. For example, if the target detects an ECC error on its disk, a status frame will be sent to report the error to the initiator. In this embodiment, it is only when no error is detected that the status frame is not sent to the initiator.

Although the above-described embodiments utilize a particular bit in the last data frame to indicate the status of the data transfer, it is not necessary to construct the last data frame any differently from existing data frames. As mentioned above, that particular bit may just be any one of the unused bits in a last frame. If the frame is not the last frame in the transfer, the bit may always have a default value of "0." By utilizing an existing bit in the last data frame and not requiring other changes to the frame or sequence, embodiments of the invention may be implemented in networks running existing protocols without any significant modifications to the network protocols. This potentially reduces the cost and time of implementing embodiments of the present invention.

By eliminating the status frames, embodiments of the invention save valuable network resources that are necessary to transmit and process the extra status frames using the current method. Although eliminating a single frame from one read operation may not seem to be that significant, it can make a huge impact in network performance and efficiency when one frame is eliminated from each of the hundreds or thousands of data transfers over the same network. The improvement in performance and efficiency not only comes as a result of the reduced traffic (number of frames transmitted) on the network, but also is due to the fact that the initiator no longer needs to spend processing cycles to process the status frames. Although FIGS. 1 and 2 illustrate the execution of a read command, embodiments of the invention may also be used to improve other network operations that traditionally require the transmission of separate status frames.

As mentioned above, embodiments of the present invention may be implemented in networks running any one of a number of the existing protocols. The next few paragraphs provide an example of how a Fibre Channel network may benefit from incorporating one of the disclosed embodiments.

Figure 4:
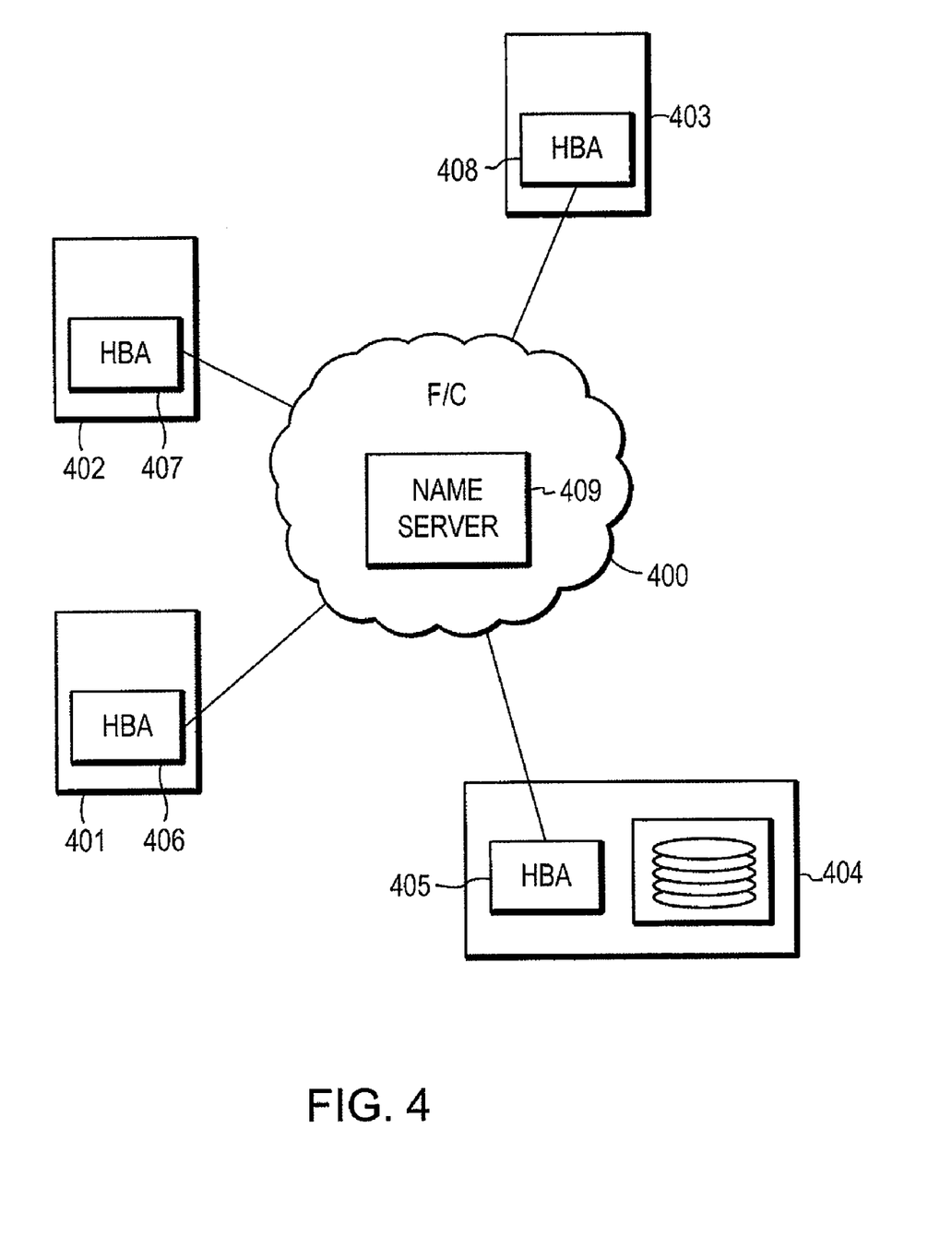
FIG. 4 illustrates a block diagram of an exemplary Fibre Channel Fabric Network.

Fibre Channel is a well-known standard for network communication. It is generally used for applications where high data transmission rates and high reliability are necessary, such as in storage networks. FIG. 4 is a diagram of an exemplary Fibre Channel network of a fabric topology. Several devices 401, 402, 403, and 404 can be connected to a Fibre Channel network 400. The exemplary network of FIG. 4 may be a storage area network, but other Fibre Channel fabric networks may have similar configurations. Devices 401-403 can be computers and device 404 can be a storage device (such as a RAID array) serving the computers. Fibre Channel Host Bus Adapters (HBAs) 405-408 can be used by the various devices 401-403 to connect to the network 400. HBAs 405-408 are networking devices which are able to perform some lower level network communications processing without burdening a main processor of the device the host bus adapter is a part of. Therefore, host bus adapters are often used with high throughput networks, such as Fibre Channel networks, where the potential burden on the main processor would be great if it had to handle the lower level network communications.

The standard Fibre Channel protocol uses a status frame to indicate whether a network communication is successful or not. In one type of Fibre Channel network, the Fibre Channel for SCSI (FCP) protocol runs on top of the Fibre Channel protocol. The FCP usually defines the frames, data command, data phases, and status phases of Fibre Channel communications. As a result, when monitoring traffic over a Fibre Channel network, one may observe the status frames in the FCP protocol. However, if an analyzer is used to monitor network traffic and all the frames are being watched, every frame in the sequence can be observed by following the Fibre Channel protocol. When an embodiment of the present invention is incorporated into the Fibre Channel protocol to eliminate the status frame at the end of each data transfer, a bit in the last data frame is defined in the Fibre Channel protocol to represent the status of the transfer. It is essential that the firmware in the initiator (i.e., the receiving end of the data transfer) be aware of the modification and recognize the particular bit in the last frame as carrying the status of the transfer.

Figure 5:
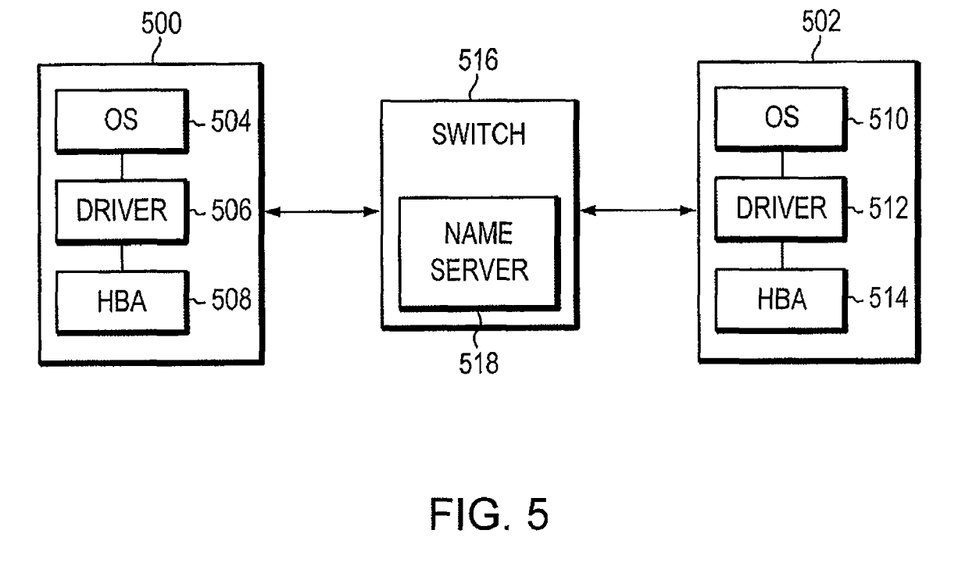
FIG. 5 illustrates an initiator and a target connected over a Fibre Channel network that is modified to include embodiments of the present invention.

FIG. 5 takes a closer look at two of the devices 401-404 of FIG. 4. One of the devices is a server 500 similar to the initiator described above, capable of requesting data transfers. The other device is a data storage device 502 similar to the target described above, capable of providing requested data to the server 500, or receiving data from the server. Both devices are connected to a Fibre Channel network. As illustrated, a network switch 516 may be used to connect the server 500 to the data storage device 502. Although only two devices are shown in FIG. 5, it is understood that many more devices may also be connected to the Fibre Channel fabric using the same switch 516.

In this embodiment, the server may include an operating system (OS) 504, a device driver 506, and an HBA 508. The OS 504 may be any type of OS including, but not limited to, MS Windows™, Unix, or Linux. The operating system is a set of one or more programs that control a computer system's (e.g., the server's) operation. The device driver 506 allows applications running in the OS 504 to interact with the HBA 508. Specifically, the device driver 506 accepts generic instructions from the OS 504 and converts them into low-level commands required by the HBA 508. The HBA 508, as introduced above, is a networking device capable of performing some lower level network communications processing without burdening a main processor (not shown) of the server 500 to which the HBA 508 belongs. As illustrated in FIG. 5, the data storage device 502 has basically the same components, namely an OS 510, a device driver 512, and an HBA 514. The OS 510, device driver 512, and HBA 514 of the data storage device 502 may be different from their counterparts in the server 500. During initiation, the server 500 first loads up the OS 504, which then initiates the device driver 506 on the server 500. Once the device driver 506 is properly loaded, the OS 504 has control of the HBA 508 and may start searching for and communicating with other devices on the network by sending out queries to other devices on the network via the HBA 514.

In a fabric network, a switch 516 is often used to connect multiple devices 500, 502 over the network. Referring to FIG. 5, the server 500 and the data storage device 502 may obtain their respective Fibre Channel addresses and the Fibre Channel addresses of each other by communicating with one of the switches 516 in the Fibre Channel network. To be visible to the other devices on the network, a device may need to share information about itself, including what type of device it is (e.g., whether it is a server or a storage device), the number, types and/or names of various modules it houses (e.g., disks, memories), and other information that may be relevant to the particular applications running on the network to which the device is connected. For that purpose, each of the devices may register with a name server 518. The name server may in turn gather and store data on each device and provide the data to other devices on the network. That is, a device having access to the name server may receive from the name server 518 the various attributes describing other devices that are connected to the network.

To establish communication with the data storage device 502, the server 500 first has to locate the data storage device and find out the various attributes of the data storage device 502. In a Fibre Channel network where switches are used, such as the one illustrated in FIG. 5, the server 500 may send an initial inquiry to the switch 516. In this embodiment, each of the devices on the network may advertise its capabilities and its location on the name server 518 in the switch 516. Thus, the name server 518 contains a list of the devices connected to the switch 516 and the protocols the devices are using. The initial inquiry by the server 500 produces the list of devices from the name server 518. Next, the server may choose from the list the data storage device it wants to communicate with. This discovery process conducted by the server 500 may not be point-to-point. The server may have to negotiate with each potential target device individually to pick out the most suitable target. In addition, the server 500 and the chosen data storage device need to establish, during discovery, a common protocol or method of communication for subsequent communication. The following paragraph describes the discovery process on the frame level.

Figure 6:
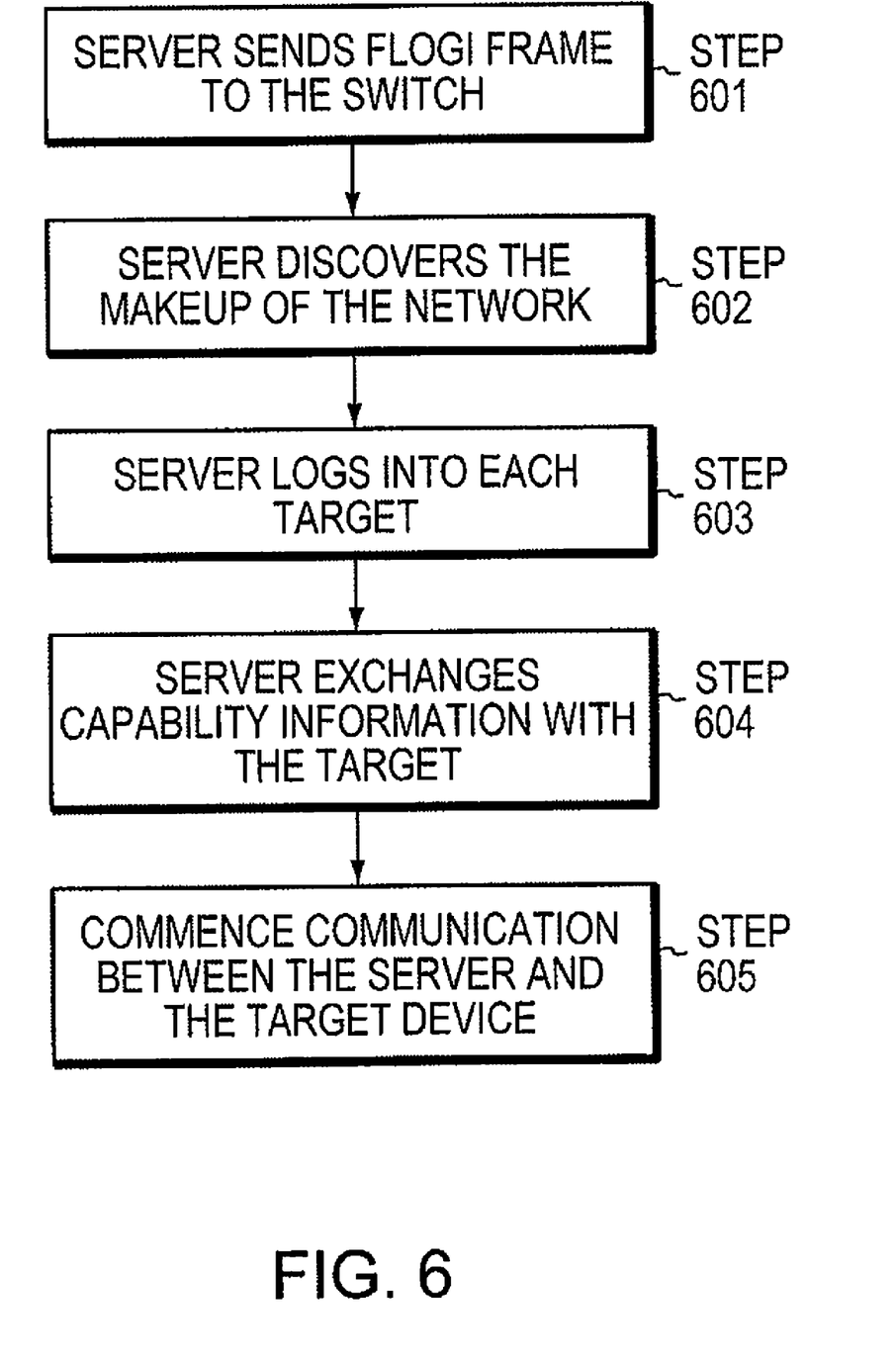
FIG. 6 is a flow chart illustrating the steps involved in establishing communication between a server and a data storage device according to embodiments of the present invention.

In a typical Fibre Channel network, other than the data frames that can be used for transferring data from one device to another, there are also non-data frames that are used for setup and messaging purposes. These non-data frames fall into three categories: link control frames, link service frames, and extended link service frames. Before the actual data frames can be requested and received, several non-data frames or sequences have to travel back and forth between the server 500 and the data storage device 502 to set up the communication. FIG. 6 illustrates the steps taken by the server 500 to establish a common communication protocol during discovery.

Referring to FIG. 6, first, the server transmits a FLOGI frame to the switch (step 601). The FLOGI frame is an extended link service frame. It informs the switch that the server is connected to the network and is open for communication. In addition, the FLOGI frame specifies the server's address. In response, the switch sends a list of the other devices available on the network back to the server (step 602). Upon receiving the list, the server sends a PLOGI frame, another extended link service frame, that represents a login request (i.e., port login) to each device that may be a potential target for communication (step 603). Next, the server follows up by sending a PRLI frame, the process login frame, to the switch to inquire about more specifics of the target devices (step 604). These specifics may include information pertaining to what type of device the target is, the target's capabilities, and what protocol(s) the target supports. The transmission of the PLOGI frame and the PRLI frame constitutes an invitation to the targets to establish a channel of communication. All the pre-communication inquiries have to be made to make sure that the right target device is identified and that the correct protocol is used to establish a connection for subsequent data requests and transfers. Transmission of these non-data frames (e.g., FLOGI, PLOGI, and PRLI frames) prior to the actual data transfer is a part of the network discovery process conducted by the server. In various embodiments, other non-data frames may be sent to gather additional information about the target devices and the network. Communication between the server and the target device may commence (step 605) after the discovery process is successfully completed.

In summary, the discovery process involves the server identifying itself to the network, obtaining a list of available target devices from the switch, and determining which target device is suitable for receiving further requests from the server. The same mechanism used to program the devices can also be used to turn on one or more of the specific features available on the devices, such as the one disclosed in embodiments of the present invention. As mentioned above, some of these available features and capabilities may be vendor-defined. Most network protocols, including the Fibre Channel protocol, have reserved bits or values in frames for vendor-specific features. This allows the server to coexist and communicate with multiple target devices that may have different configurations and use different protocols.

Specifically, as a part of the discovery process, the server 500 also needs to determine whether the target data storage device 502 has adopted one of the embodiments of the present invention—that is, whether the data storage device 502 still transmits status frames at the end of each data transfer or has the capability to set one of the unused bits in the last data frame to indicate transmission status. If both the server and the data storage device can support the methods disclosed in embodiments of the invention, the designated bit in the last frame is enabled for data transfers between the two devices. Otherwise, communication between the devices remains as before, using an unmodified existing protocol. Because there may be many different data storage devices connected to the Fibre Channel network and it is not required that all devices adopt the same protocol for transmitting status information, it is essential for the server 500 to find out which protocol is used by a particular data storage device 502 before commencing a dialog with the device.

Advantages of using embodiments of the invention will now be discussed. Most networks may benefit from the present invention in terms of performance simply because most network traffic consists of read operations (e.g., the number of read commands and the number of write commands over a Fibre Channel network typically has a ratio of approximately 5 to 1) that are relatively small in size (e.g., 2 kb per request). For example, if a data transfer in response to a read command only involves a total of 3 frames, including the status frame, given that the transfer is conducted using one of the existing protocols without incorporation embodiments of the invention, eliminating the status frame reduces the number of frames traversing the network by one third—a significant reduction, percentage-wise. As a result, substantial reductions in network traffic may be achieved.

In addition to reducing network traffic, embodiments of the invention may also save network resources that would otherwise be required to handle and process the status frames in a typical data transfer. Although embodiments of the invention may be implemented in networks running different protocols, the performance improvement gains by the networks may not be the same in every network, depending in part on which existing protocol is used by the network. For example, Fibre Channel over Ethernet (FCoE) networks may benefit significantly more from incorporating embodiments of this invention than a regular Fibre Channel network would. In general, the FCoE protocol maps Fibre Channel frames over selected full duplex IEEE 802.3 networks. This allows Fibre Channel to leverage 10 gigabit Ethernet networks while preserving the Fibre Channel protocol. Ethernet is a network communication standard traditionally used for applications for which the data transmission rate and reliability requirements are not as high as they are for Fibre Channel applications. For example, Ethernet is often used as a base layer for TCP/IP networks, which are in turn used for Internet networking. However, Ethernet is very prevalent. Thus, it may save a lot of resources by providing a way to run applications traditionally relying on Fibre Channel on an Ethernet network.

Since FCoE runs over a standard Ethernet network rather than a Fibre Channel network, it does not include any buffer credit flow control. This creates a problem when the incoming data frames require more space to store than is available in the buffers of the receiving device (i.e., the server of FIG. 5). When the sender (i.e., the data storage device of FIG. 5) sends more frames than the buffers in the receiving device have room for, the extra frames may be dropped. Unlike Ethernet, FCoE is not capable of dealing with dropped frames. A whole sequence may have to be retransmitted if one frame is dropped due to lack of available buffer space. To prevent frames from being dropped, the receiving device may be designed to send a "pause" message to the sender and ask the sender to stop sending more frames over, as the buffer on the receiving device is about to run out of space. The "pause" message may only consist of a single frame. However, what is essential is that the message has to reach the sender before the sender can overload the buffer in the receiving device. One problem is that it takes time for the "pause" message to travel over the network and reach the sender, and at the same time, the sender is still sending frames in the receiving device's direction. Therefore, some receiving devices are designed not to wait until their buffer completely runs out before sending out the "pause" message. A threshold (e.g., 5 frames before the buffer runs out) may be set in the receiving device that would trigger sending the "pause" message when there is only space left in the buffer for 5 more frames. That would give the "pause" message enough time to reach the sender and prevent it from sending more frames to the receiving device.

Since traffic over a FCoE network is usually heavier than that of a Fibre Channel network, the receiving device needs more time to warn the sender before being overrun by incoming traffic. Therefore, it is especially important to minimize the number of frames being transmitted over a FCoE network. By eliminating the status frame in each data transfer, embodiments of the invention help to save buffer space that would otherwise be occupied by the status frames. For these reasons, this invention benefits FCoE networks much more, as it gives the receiving device more time to handle the large number of frames it receives.

Embodiments of the invention may be implemented in firmware or hardware or a combination of the two. For example, the required changes may be implemented by modifying existing firmware on the server and the data storage device so that they can read and set, respectively, the designated bits in the last frame of a data transfer to indicate status of the data transfer. In addition, both the server and the data storage device may retain the capability of communicating with legacy devices that still transmit separate status frames. In other words, embodiments of the invention can be incorporated in existing network protocols and still allow the protocols to be backward compatible.

Figure 7:
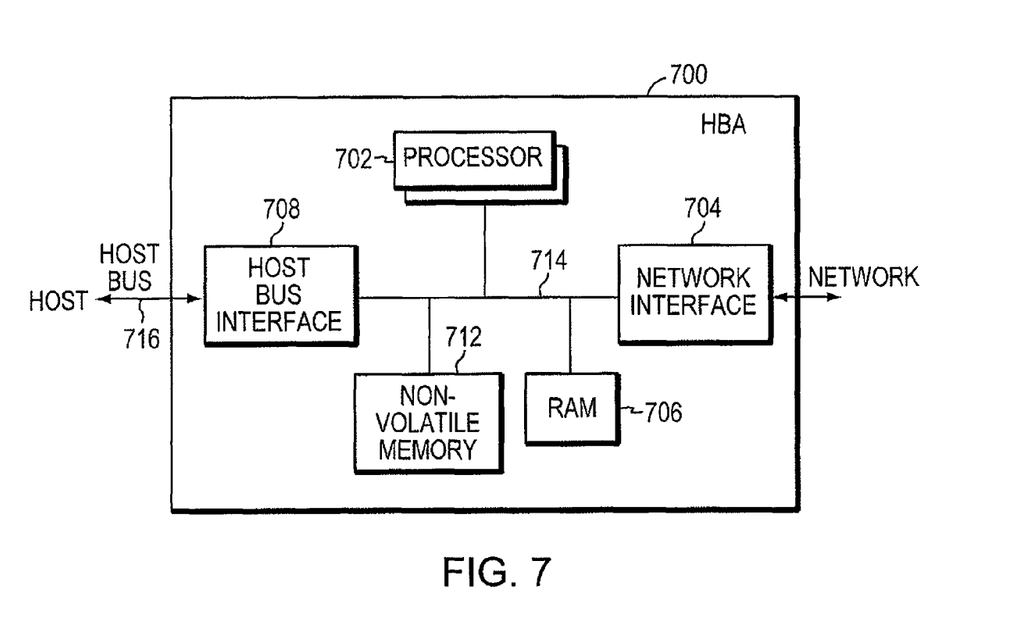
FIG. 7 illustrates a block diagram of an exemplary Host Bus Adaptor (HBA) according to embodiments of the present invention.

FIG. 7 illustrates an exemplary HBA that may be a part of the server or the data storage device. As illustrated, the HBA 700 includes one or more processors 702, a network interface 704, a host bus interface 708, and computer readable storage media, such as Random Access Memory (RAM) 706 and non-volatile memory 712. The various components of the HBA 700 are all connected to a bus 714 in the HBA 700 and adapted to communicate with each other using the bus 714. The RAM 712 and the non-volatile memory 706 may be used to store firmware of the HBA 700 and other data. In other embodiments, the firmware may be stored on an external computer-readable storage medium such as a disk and loaded into the HBA 700 during operation. The host bus interface 708 connects the MBA 700 to its host via a host bus 710. The network interface 704 provides a gateway to an external network.

Figure 8:
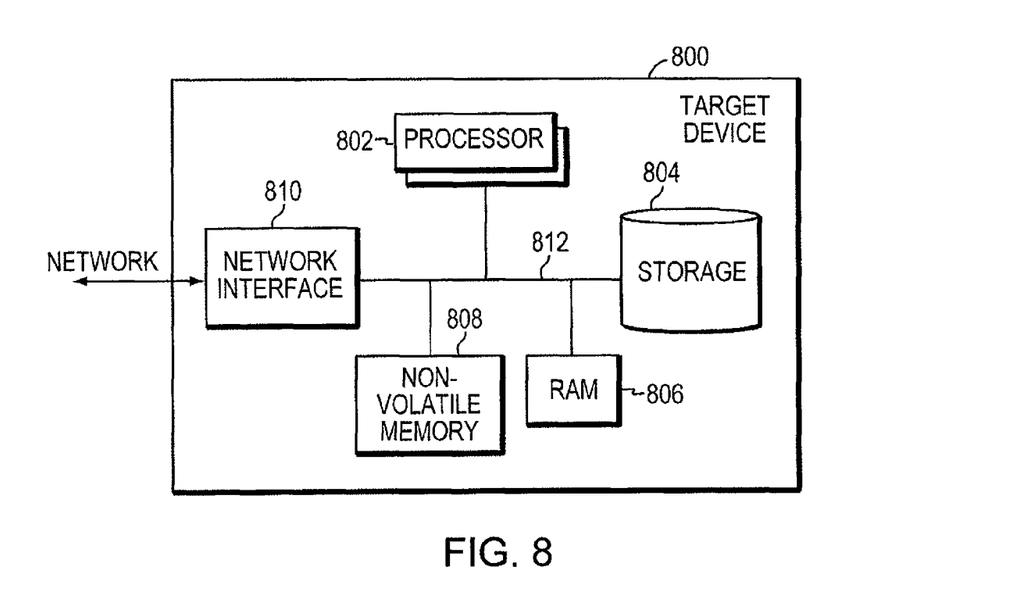
FIG. 8 illustrates a block diagram of an exemplary target device according to embodiments of the present invention.

FIG. 8 illustrates an exemplary target device according to an embodiment of the invention. The target device 800 includes one or more processors 802, a storage device 804, a network interface 810, RAM 806, and non-volatile memory 808. The target device 800 may also include one or more device drivers and an HBA (not shown) as described above in view of FIG. 5. The processor may execute instructions stored in the RAM 806 and the non-volatile memory 808. The storage device 804 may be a disk capable of storing programs such as firmware for the HBA. The target is adapted to receive read commands and, in response, send data to other devices on the network using the network interface 810.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of indicating a status of a transfer of data from a first device to a second device over a network, the data being transferred using one or more data frames, each data frame including a header having one or more bits and at least a part of the data being transferred, the method comprising:
  indicating, by the first device, a successful transfer status, without using a status frame containing no data being transferred, by setting a last bit of the one or more bits in the header of a last data frame of the one or more data frames to a first value;
  indicating, by the first device, a failed transfer status by setting the value of the last bit of the last data frame to a second value;
  discovering whether the second device receiving the data is adapted to check a value of the last bit of the one or more bits in the header of the last data frame to determine the status of the data request; and
  sending a status frame following the last data frame to the second device if the second device fails to check the value of the last bit.

2. The method of claim 1, further comprising sending a status frame following the last data frame if the transfer had an error.

3. The method of claim 1, wherein the network is one of a Fibre Channel over Ethernet network and a Fibre Channel network.

4. A method of executing a data transfer from an initiator to a target over a network, the method comprising:

receiving, at the target, a request for data from the initiator;

sending data from the target to the initiator in response to the request, the data stored in one or more sequences, each of the one or more sequences including one or more data frames, each data frame containing at least a part of the data being sent;

if the transfer is executed successfully, indicating a good status, without using a status frame containing no data being transferred, by setting at least one bit in a header of a last data frame of a last sequence of the one or more sequences to a predefined value;

discovering whether an initiator receiving the data is adapted to check a value of the at least one bit in the header of the last data frame to determine a status of the data request; and sending a status frame following the last data frame to the initiator if the initiator fails to check the value of the at least one bit in the header of the last data frame.

5. The method of claim 4, further comprising sending a status frame following the last data frame if the data transfer failed.

6. The method of claim 4, wherein the request is a read command.

7. A method of improving performance of a computer network, the computer network adapted to handle data transfers between devices connected to the computer network, the method comprising:

utilizing, by one of the devices, one or more bits in a last data frame of one or more data frames used for transferring data to indicate a status of the respective transfer;

discovering whether one of the devices receiving the data is adapted to check a value of the at least one bit in the header of the last data frame to determine a status of the transfer; and sending a status frame following the last data frame to the one of the devices if the one of the devices fails to check the value of the at least one bit in the header of the last data frame, wherein each of the one or more data frames contains at least part of the data being transferred.

8. The method of claim 7, further comprising sending a status frame following the last data frame if the data transfer failed.

9. A target device connected to a network, the target device comprising:

means for receiving a data request over the network;

means for transferring at least one sequence of data in response to the data request, the at least one sequence including one or more data frames, each of the one or more data frames containing at least a part of the requested data and including a header;

means for indicating a successful data transfer by setting at least one bit in the header of a last data frame of the one or more data frames to a predefined value without using a status frame containing no data being transferred;

means for discovering whether the target receiving the data is adapted to check a value of the at least one bit in the header of the last data frame to determine a status of the data request; and means for sending a status frame following the last data frame to the initiator if the initiator fails to check the value of the at least one bit in the header of the last data frame.

10. The target device of claim 9, further comprising means for sending a status frame following the last data frame if the data request failed.

11. The target device of claim 9, wherein the target device is a data storage device.

* * * * *